United States Patent [19]

Streu et al.

[11] Patent Number: 4,837,245

[45] Date of Patent: Jun. 6, 1989

[54] PROCESS FOR THE PREPARATION OF NON-CELLULAR OR CELLULAR POLYURETHANE ELASTOMERS IN THE PRESENCE OF A POLYESTER POLYOL CONTAINING THEREIN TITANIUM AND/OR TIN COMPOUNDS AS CATALYSTS

[75] Inventors: Joachim Streu, Diepholz; Wolfgang Straehle, Heidelberg; Gerhard Ramlow, Weinheim, all of Fed. Rep. of Germany

[73] Assignee: BASF Aktiengesellschaft, Ludwigshafen, Fed. Rep. of Germany

[21] Appl. No.: 116,633

[22] Filed: Nov. 4, 1987

[30] Foreign Application Priority Data

Nov. 11, 1986 [DE] Fed. Rep. of Germany ....... 3638488

[51] Int. Cl.$^4$ .................... C08G 18/08; C08G 18/22; C08J 9/00
[52] U.S. Cl. .................... 521/117; 521/123; 521/127; 521/172; 521/173; 528/56; 528/58; 528/66; 252/182.14; 252/182.3; 502/102; 502/151
[58] Field of Search ............. 521/127, 124, 117, 123, 521/172, 173; 528/56, 58, 66

[56] References Cited

U.S. PATENT DOCUMENTS

| | | |
|---|---|---|
| 3,450,648 | 6/1969 | Windemuth et al. ............... 521/124 |
| 4,160,853 | 7/1979 | Ammons ............................ 528/56 |
| 4,263,408 | 4/1981 | Meyborg et al. .................... 528/56 |
| 4,263,423 | 4/1981 | Schwindt et al. ................... 521/124 |
| 4,365,670 | 12/1982 | McLaughlin ...................... 521/124 |
| 4,568,703 | 2/1986 | Ashida ............................. 521/124 |
| 4,727,099 | 2/1988 | Vasta ............................... 528/58 |

FOREIGN PATENT DOCUMENTS

| | | | |
|---|---|---|---|
| 586707 | 11/1959 | Canada | 521/124 |
| 1006630 | 3/1962 | Canada | 521/124 |

Primary Examiner—John Kight
Assistant Examiner—Dennis R. Daley
Attorney, Agent, or Firm—Bill C. Panagos

[57] ABSTRACT

This invention relates to a process for the preparation of non-cellular or cellular polyurethane elastomers by the reaction of (a) an organic polyisocyanate, preferably in the form of NCO groups containing prepolymers and/or modified urethane group containing organic polyisocyanates with (b) a higher molecular weight compound having at least two reactive hydrogen atoms, (c) a polyester polyol containing tin and/or titanium compounds as catalysts, and optionally (d) a chain extending agent and/or crosslinking agent in the presence of (e) blowing agents, (f) auxiliaries and/or additives whereby from 0.1 to 10 parts by weight, based on 100 parts by weight of the (b) component, of a polyester polyol is used as a catalyst, which is prepared by the polycondensation of organic polycarboxylic acid with multivalent alcohols in the presence of from 0.002 to 5 weight percent, based on the weight of the polycondensation mixture, of a titanium and/or tin compound used as a catalyst at temperatures from 150° to 200° C., as well as using this catalyst in the preparation of plastics using the polyisocyanate addition polymerization process, preferably for preparing polyurethane-plastics.

8 Claims, No Drawings

PROCESS FOR THE PREPARATION OF NON-CELLULAR OR CELLULAR POLYURETHANE ELASTOMERS IN THE PRESENCE OF A POLYESTER POLYOL CONTAINING THEREIN TITANIUM AND/OR TIN COMPOUNDS AS CATALYSTS

FIELD OF THE INVENTION

The preparation of non-cellular or cellular polyurethane elastomers by the reaction of organic polyisocyanates with organic polyhydroxyl compounds in the presence of catalysts and optionally chain extending agents and/or cross linking agents, blowing agents, auxiliaries and/or additives is old and well known. With the proper selection of hydroxyl containing polyesters, polyethers, polyesteramides, etc., and organic polyisocyanates, and by employing chain extending agents like e.g. glycols, trivalent alcohols and/or diamines, it is possible to prepare elastic and rigid, optionally cellular polyurethane elastomers as well as all of the modifications lying in between.

Because of improved processing techniques, the requirements for suitable polyurethane elastomer systems continue to increase. In order to achieve the shortest cycle times possible in preparing molded articles; i.e. to reduce the demold time, the curing of the molded article must be clearly improved, and the foaming times, i.e. the cream time, rise time, and gel time, should not be too short, in order to insure the uniform filling of the mold and in order to insure a homogeneous reaction. Extended cream times are desirable in order to achieve longer flow distances.

The previously known catalysts and catalyst systems have a low selectivity. By increasing the catalysts, generally the curing is improved, but, at the same time, the cream time, rise time and gel times are shortened. When determining the reactivity for a polyurethane system, routinely a compromise is made in selecting the catalysts, so that within tolerable foam time, sufficient curing is achieved.

DESCRIPTION OF PRIOR ART

The preparation of polyurethane elastomers, their physical properties and use, is described in the High Polymers Monograph, volume XVI *Polyurethanes*, Parts 1 and 2 by I.H. Saunders and K.C. Frisch (Verlag Interscience Publishers, New York, 1962 and/or 1964) and in the *Plastics Handbook*, Volume VII, Polyurethanes, 1966 and 1983 by R. Vieweg and A. Hochtlen and/or G. Oertel (Carl-Hanser-Verlag, Munich).

In preparing polyurethane elastomers according to U.S. Pat. No. 2,778,810, (DE A 831 604) NCO group containing prepolymers are first prepared from the higher molecular compounds containing hydroxyl groups, and organic polyisocyanates, which are then reacted in a second step with a chain extending agent, such as diols or diamines, into higher molecular weight elastomers.

Because of their high reactivity, diamines cannot generally be used in a one-shot process. However, the development of high pressure RIM technology has permitted the preparation of optionally cellular, elastic molded articles having a dense surface of polyurethane-polyurea elastomers by reacting a one-shot system, which essentially comprises organic polyisocyanates, polyols, aromatic diamines and/or polyamines whose amino groups are stearically hindered by ortho-positioned alkyl substituents, and a strong catalyst for the reaction between the hydroxyl and isocyanate groups, in a closed mold. Such processes are described in U.S. Pat. No. 4,218,543, (DE A-26 22 951) and in EP A-26 915 and EP A-69 286.

However, polyurethane elastomers may be prepared using the one-shot process with low pressure technology or reaction injection molding technology (RIM) in open or preferably in closed molds. These processing techniques are described in EP-A-0 017 060, in the monograph *Integral Skin Foams* by H. Piechota and H. Röhr (Carl-Hanser Verlag, Munich & Vienna, 1975), and in *Journal of Cellular Plastics*, March/April 1975, Pg, 87 to 98 by D. I. Prepelka and J. L. Wharton in the *Journal of Cellular Plastics*, March/April 1973 and by U. Knipp.

Moreover, molded articles may also be prepared from polyurethane elastomers using the casting process.

The preparation of polyesters in the presence of tin or titanium compounds as catalysts is also disclosed in the U.S. Pat. Nos. 2,727,881, 2,822,348 and 2,951,060.

SUMMARY OF THE INVENTION

The present invention relates to a process for the preparation of cellular and non-cellular polyurethane elastomers in the presence of a polyester and/or polyether polyol containing therein titanium and/or tin compounds as catalysts.

The object of the present invention is to develop suitable catalysts or catalyst systems, which insure a rapid curing of the polyurethane systems when preparing molding articles without substantially altering the foaming times.

The object of the present invention are surprisingly met by a process for the preparation of non-cellular or cellular polyurethane elastomers. This process is carried out by the reaction of (a) an organic polyisocyanate with
(b) a higher molecular compound having at least two reactive hydrogen atoms and optionally
(c) a polyester polyol containing tin and/or titanium compounds as catalysts, and optionally
(d) chain extending agents and/or crosslinking agents in the presence of
(e) blowing agents
(f) auxiliaries and/or additives wherein the polyester polyol (c) containing therein the said compounds as catalysts, are used as catalysts. The polyols are prepared by the polycondensation of organic carboxylic acid with multivalent alcohol in the presence of titanium and/or tin compounds, and are used as a catalyst, when heated to temperatures from 150° to 205° C.

DETAILED DESCRIPTION OF THE PREFERRED EMBODIMENTS

The subject of the present invention is the use of a polyester polyol which contains titanium and/or tin compounds as a catalyst in the preparation of polyurethane elastomers. The polyol has a functionality of from about 2 to 4, a hydroxyl number of from about 20 to 300 and an acid number less than about 10. They may be prepared by the polycondensation of organic polycarboxylic acids with multivalent alcohols in the presence of from about 0.002 to 5 weight percent, based on the weight of the mixture composed of polycarboxylic acids and multivalent alcohols, at least one titanium and/or tin compound, preferably an organic titanic acid ester having the structure Ti(OR)$_4$ in which R stands for a linear, branched or cyclic alkyl radical having from 1 to 6 carbon atoms, in a quantity from 0.1 to 10 parts by weight per 100 parts by weight of the higher molecular weight compound having at least 2 reactive hydrogen atoms, such as component (b). These polyols are useful as catalysts in the preparation of plastics using the polyisocyanate addition polymerization process, and are preferably used in the preparation of polyurethane-plastics.

By using a polyester polyol which contains tin or preferably titanium compounds as a catalyst in small quantities relative to less reactive higher molecular weight compounds having at least 2 Zerewitinoff active hydrogen atoms, the reactivity of these products is clearly increased, so that in polyurethane elastomer systems, the curing time, when preparing molded articles, is substantially improved without adversely influencing the foam times. Surprisingly, the curing of the polyurethane elastomers is only improved if the suitable polyester polyols were catalyzed during their preparation by using tin and/or titanium compounds, or if the polyester polyols that are prepared according to conventional processes, are treated with tin and/or titanium compounds subsequently at a temperature of at least 105° C., for more than 10 minutes. A simple solution of titanium and/or tin compounds at room temperature without the additional heat treatment leads to no improvement in the curing of the polyurethanes.

The following can be noted regarding starting components (a), (b), and (c), as well as optionally (d), (e), and (f) used in the process of this invention for the preparation of non-cellular or preferably cellular polyurethane elastomers. Typical organic polyisocyanates (a) are essentially the known aliphatic, cycloaliphatic, araliphatic, and optionally aromatic polyfunctional isocyanates.

Typical examples are: alkylene diisocyanates having from 4 to 12 carbon atoms in the alkylene radical such as 1,12-dodecane diisocyanate, 2-ethyl tetramethylene-1,4-diisocyanate, 2-methyl-pentamethylene-1,5-diisocyanate, 1,4-tetramethylene diisocyanate, and optionally 1,6-hexamethylene diisocyanate; cycloaliphatic diisocyanates such as 1,3-cyclohexane diisocyanate, and 1,4-cyclohexane diisocyanate, as well as various mixtures of these isomers, 1-isocyanato-3,3,5-isocyantomethylcyclohexane (isophorone diisocyanate), 2,4- and 2,6-hexahydrotoluene diisocyanate as well as corresponding isomer mixtures, 4,4'-, 2,2'-, and 2,4'-dicyclohexylmethane diisocyanate as well as corresponding isomer mixtures, and optionally aromatic di- and polyisocyanates, for example, 2,4- and 2,6-toluene diisocyanate and corresponding isomer mixtures, 4,4'-, 2,4'-, and 2,2'-diphenylmethane diisocyanate and corresponding isomer mixtures, mixtures of 4,4'- and 2,4'-diphenylmethane diisocyanates, polyphenyl-polymethylene polyisocyanates, mixtures of 4,4'-, 2,4'-, 2,2'-diphenylmethane diisocyanates and polyphenyl-polymethylene polyisocyanate (polymeric MDI) and mixtures of polymeric MDI and toluene diisocyanates. The organic di- and polyisocyanates may be used individually or in the form of mixtures.

Frequently, so-called modified polyfunctional isocyanates are used, i.e. products obtained by chemically reacting the above di -and/or polyisocyanates. Typical examples are ester, urea, biuret, allophanate, carbodiimide, isocyanurate, and/or urethane group-containing di and/or polyisocyanates. Examples of resultant products include urethane group-containing organic, preferably aromatic polyisocyanates having isocyanate contents of from 15 to 33.6 percent by weight, preferably from 21 to 31 percent by weight, based on the total weight, for example, of modified 4,4'-diphenylmethane diisocyanate or modified 2,4-and/or 2,6 toluene diisocyanate.

The isocyanates are modified by reacting them with low molecular weight diols, triols, dialkylene glycols, trialkylene glycols, or polyoxyalkylene glycols having molecular weights up to 800. Typical examples of the di- or polyoxyalkylene glycols which may be used individually or as mixtures are: diethylene glycol, dipropylene glycol, polyoxyethylene glycol, polyoxypropylene glycol, and polyoxypropylene polyoxyethylene glycol. Isocyanate group-containing prepolymers having isocyanate contents from 9 to 21 percent by weight, preferably from 14 to 21 percent by weight, based on the total weight are also suitable. Said prepolymers may be prepared from the polyether and/or preferably polyester polyols described below and 4,4'-diphenylmethane diisocyanate, mixtures of 2,4'and 4,4'-diphenylmethane diisocyanate, 2,4- and/or 2,6-toluene diisocyanates or polymeric MDI. In addition, liquid carbodiimide group- and/or isocyanurate ring-containing polyisocyanates having isocyanate contents from 15 to 33.6 percent by weight, preferably from 21 to 31 percent by weight, based on the total weight have also proven to be effective. For example, those based on 4,4'-, 2,4'-, and/or 2,2'-diphenylmethane diisocyanate and/or 2,4 and/or 2,6-toluene diisocyanate have proven very effective.

The modified polyisocyanates may optionally be mixed together or with unmodified organic polyisocyanates such as 2,4'-4,4'-diphenylmethane diisocyanate, polymeric MDI, 2,4- and/or 2,6-toluene diisocyanate.

The following have been found to be particularly effective for use as the organic polyisocyanates. Their use is therefore preferred: isocyanate group-containing prepolymers having an isocyanate content from 9 to 25 percent by weight, more preferably based on polyether or polyester polyols and one or more diphenylmethane diisocyanate isomers, most preferably 4,4'-diphenylmethane diisocyanate and/or modified urethane group containing organic polyisocyanates having an isocyanate content from 15 to 33.6 percent by weight, most preferably based on 4,4'-diphenylmethane diisocyanate or diphenylmethane diisocyanate isomer mixtures.

For the higher molecular weight compounds (b) having at least two reactive hydrogen atoms, it has been found desirable to use those having a functionality of from about 2 to 8, preferably from about 2 to 4, and a molecular weight of from about 800 to 8000, preferably from about 1200 to 6000. For example, polyether polyamines and/or, preferably, polyols selected from the group consisting of polyether polyols, polyester polyols, polythioether polyols, polyester amides, hydroxyl group-consisting of polyacetals, and hydroxyl group containing aliphatic polycarbonates or mixtures of at least two of the cited polyols have proven to be effective. Polyester polyols and/or polyether polyols are preferably used.

Suitable polyester polyols may be prepared from organic dicarboxylic acids having from about 2 to 12 carbon atoms, preferably aliphatic dicarboxylic acids having from about 4 to 6 carbon atoms, and polyfunctional alcohols, preferably diols, having from about 2 to 12 carbon atoms, preferably from 2 to 6 carbon atoms.

Typical carboxylic acids which may be used are: succinic acid, glutaric acid, adipic acid, suberic acid, axelaic acid, sebacic acid, decane dicarboxylic acid, maleic acid, and fumaric acid. The dicarboxylic acids may be used individually or as mixtures with one another. Instead of the free dicarboxylic acids, the corresponding dicarboxylic acid derivatives may be used, such as the dicarboxylic acid esters of alcohols having from about 1 to 4 carbon atoms or dicarboxylic anhydrides. It is preferred to use dicarboxylic acid mixtures of succinic, glutaric, and adipic acid in quantitative ratios of, for example, 20–35:35–50:20–32 parts by weight, respectively. More preferably, adipic acid may be used alone. Typical examples of di- and polyfunctional alcohols, preferably diols, are; ethanediol, diethylene glycol, 1,2- and 1,3-propanediol, dipropylene glycol, 1,4-butanediol, 1,5-pentanediol, 1,6-hexanediol, 1,10-decanediol, glycerine, and trimethylolpropane. Preferably used are ethanediol, diethylene glycol, 1,4-butanediol, 1,5-pentanediol, 1,6-hexanediol, or mixtures of at least two of the cited diols, preferably mixtures of 1,4-butanediol, 1,5-pentanediol, and 1,6-hexanediol. In addition, polyester polyols of lactones, for example ε-caprolactone, or hydroxylcarboxylic acids, such as ω-hydroxycaproic acid, may be used.

For the preparation of the polyester polyols, aromatic, and preferably aliphatic, polycarboxylic acid and/or their derivatives and multivalent alcohols are polycondensed catalyst-free or preferably in the presence of esterification catalyst and preferably in an atmosphere of an inert gas like nitrogen, carbon monoxide, helium, argon, etc., in a melt at temperatures from 150 to 250° C., more preferably from 180° to 220° C., optionally under reduced pressure up to the desired acid number, which is preferably less than about 10, and more preferably, is less than about 2.

In accordance with one of the preferred embodiments, the esterification mixture is polycondensed within the above stated temperature range up to an acid number of from 80 to 30, more preferably from about 40 to 30, under normal pressure and subsequently under a pressure less than about 500 mbar, and preferably from about 50 to 150 mbar. Examples of esterification catalysts are iron-, cadmium-, cobalt-, lead-, zinc-, antimony-, magnesium-, titanium- and tin catalysts in the form of metals, metal oxides, or metal salts. However, the polycondensation may also be carried out in the liquid phase in the presence of a diluent and/or entraining agent like benzene, toluene, xylene or chlorobenzene for the azeotropic distillation of the water of condensation.

In preparing the polyester polyols, the organic polycarboxylic acids and their derivatives and multivalent alcohols are preferably polycondensed in a mole ratio of from about 1:1 to 1.8, and more preferably from about 1:1.05 to 1.2.

The resulting polyester polyols preferably have a functionality of from about 2 to 4, more preferably of from about 2 to 3 and have a molecular weight of from about 800 to 3000, more preferably from about 1200 to 3000 and most preferably from about 1800 to 2500.

Particularly preferred as polyols are polyether polyols prepared by known methods, such as, anionic polymerization using alkali hydroxides such as sodium hydroxide or potassium hydroxide, or alkali alcoholates such as sodium methylate, sodium or potassium ethylate, or potassium isopropylate as catalysts, or by cationic polymerization using Lewis acids such as antimony pentachloride, borofluoride etherate, etc., or bleaching earth as catalysts, from one or more alkylene oxides having from 2 to 4 carbon atoms in the alkylene radical, and an initiator which contains from about 2 to 8, preferably from about 2 to 4 reactive hydrogen atoms.

Suitable alkylene oxides are tetrahydrofuran 1,3-propylene oxide, 1,2-, and 2,3-butylene oxide, styrene oxide, epichlorohydrin, and preferably ethylene oxide and 1,2-propylene oxide. The oxides may be used individually, alternately one after another, or as mixtures. Typical initiators are: water, organic dicarboxylic acids such as succinic acid, adipic acid, phthalic acid, and terephthalic acid, aliphatic and aromatic, optionally N-mono, N,N- and N,N'-dialkyl substituted diamines having from 1 to 4 carbon atoms in the alkyl radical such as optionally mono- and dialkylsubstituted ethylenediamine, diethylenetriamine, triethylenetetramine, 1,3-propylenediamine, 1,3 respectively 1,4-butylenediamine, 1,2-, 1,3-, 1,4-, 1,5-, and 1,6-hexamethylenediamine, phenylenediamines, 2,4- and 2,6-toluenediamine, and 4,4'-, 2,4'- and 2,2'diaminodiphenylmethane.

Typical initiators are also alkanol amines such as ethanolamine, diethanolamine, N-methyl- and N-ethylethanolamine, N-methyl- and N-ethyldiethanolamine, and triethanolamine, ammonia, hydrazine, and hydrazides. It is preferred to use polyfunctional, and more preferably di- and/or trifunctional alcohols such as ethanediol, 1,2- and 1,3-propanediol, diethylene glycol, dipropylene glycol, 1,4-butanediol, 1,6-hexanediol, glycerine, trimethyolpropane, pentaerythritol, sorbitol, and sucrose.

Suitable polyether polyols preferably have a functionality of from 2 to 4, most preferably of from 2 to 3, and molecular weights from about 800 to 8000, more preferably from about 1200 to 6000, and most preferably from about 1800 to 4000. As with the polyester polyols, they may be used individually or in the form of mixtures. They may also be mixed with the polyester polyols as well as the hydroxyl group-containing polyester amides, polyacetals, polycarbonates, and/or polyether polyamines.

Typical hydroxyl group-containing polyacetals which may be used are compounds produced from glycols such as diethylene glycol, triethylene glycol, 4,4'-dihydroxy-ethoxydiphenyldimethylmethane, hexanediol, and formaldehyde. Suitable polyacetals may also be prepared by polymerizing cyclic acetals.

Hydroxyl group-containing polycarbonates which may be used are those which may be prepared through the reaction of diols such as 1,3-propanediol, 1,4-butanediol, and/or 1,6-hexanediol, diethylene glycol, triethylene glycol, or tetraethylene glycol with diaryl carbonates, such as diphenyl carbonate, or phosgene.

Among the polyesters amides which may be used are those selected from polyfunctional saturated and/or unsaturated carboxylic acids or their anhydrides and polyfunctional saturated and/or unsaturated amino alcohols or mixturees of polyfunctional alcohols and amino alcohols and/or polyamines, preferably linear condensates.

Suitable polyether polyamines may be prepared from the polyether polyols cited above using known methods. Typical examples are the cyanoalkylation of polyoxy-alkylene polyols with the subsequent hydrogeneration of the nitrile which is formed, as disclosed in U.S. Pat. No. 3,267,050, or the amination of polyoxyalkylene polyols with amines or ammonia in the presence of hydrogen and catalysts, as disclosed in Federal Republic of Germany Pat. No. 12,15,373.

The dense or cellular polyurethane elastomers may be prepared with or without the use of chain extenders and/or crosslinking agents (d). In order to modify the mechanical properties, e.g., hardness, it has been found useful to add chain extenders, crosslinking agents, or optionally mixtures thereof in amounts from about 2 to 12 parts be weight, preferably from about 4 to 10 parts by weight, based on 100 parts by weight of the (b) component. Diols and/or triols having molecular weights less than about 400, preferably from about 60 to 300, are used as the chain extenders and/or crosslinking agents. Typical examples are aliphatic, cycloaliphatic, and/or araliphatic diols having from 2 to 14, preferably 4 to 10 carbon atoms, such as ethylene glycol, 1,3-propanediol, 1,10-decanediol, ortho-, meta, para-dihydroxycyclohexane, diethylene glycol, dipropylene glycol, and preferably 1,4-butanediol, 1,6-hexanediol, and bis(2-hydroxyethyl)-hydroquinone, triols such as 1,2,4-, 1,3,5-trihydroxycyclohexane, glycerine, and trimethylolpropane, and low molecular weight hydroxyl group-containing polyalkylene oxides based on ethylene and/or 1,2-propylene oxide and the above-cited diols and/or triols as initiators.

The essential characteristic of the invention is using a polyester polyol (c) containing therein tin and/or titanium compounds as catalysts, as a catalyst. The suitable polyols are which is prepared by the polycondensation of the previously stated organic polycarboxylic acids and multivalent alcohols in the presence of tin and/or preferably titanium compounds at temperatures from about 150° to 250° C. However, according to the process of this invention, one may utilize polyester polyols which are prepared catalyst-free or use various esterification catalysts and subsequently subject them to treatment with tin and/or preferably titanium compounds, at a temperature of at least 150° C., more preferably from 150° to 250° C. and most preferably from 180° to 220° C. for at least 10 minutes, more preferably from about ½ to 12 hours and most preferably from about ⅓ to 4 hours.

The catalyst containing polyester polyol (c) which is used in the preparation of non-cellular or preferably cellular polyurethane elastomers is present in quantities from about 0.1 to 10 parts by weight, more preferably from about 1 to 5 parts by weight, per 100 parts by weight of the higher molecular weight compounds (b). Preferably, it has a functionality from about 2 to 4, more preferably from about 2 to 3 and most preferably of about 2; a hydroxyl number from about 20 to 300, more preferably from about 30 to 200, and most preferably from about 40 to 80; and acid number less than about 10, preferably less than about 2 and most preferably less than about 1.

The polyester polyol (c) may be prepared from the previously stated organic polycarboxylic acids and/or their derivatives, and a multivalent alcohol. These are reacted at temperatures from about 150° to 250° C., more preferably from about 180° to 220° C., and using reaction times from about 2 to 30 hours, more preferably from about 6 to 18 hours in the presence of tin and/or preferably titanium compounds as esterfication catalysts as well as optionally under the other reaction conditions previously stated.

Aromatic and aliphatic dicarboxylic acids are preferably used as the organic polycarboxylic acid. Suitable examples include phthalic acid, isophthalic acid, terephthalic acid, succinic acid, glutaric acid, adipic acid and azelaic acid or mixtures of aliphatic, aromatic, or aliphatic and aromatic dicarboxylic acids.

The preferred multivalent alcohols are alkane diols having from about 2 to 6 carbon atoms. Suitable examples include ethane 1,2-and 1,3-propane, 1,4-butane, 1,5-pentane, 1,6-hexanediol and/or neopentyl glycol and/or polyoxyalkylene-diols having molecular weights from about 96 to 600, more preferably from about 96 to 300 based on ethylene oxide, 1,2-propylene oxide and/or tetrahydrofuran.

Suitable examples of gylcols include diethylene glycol, triethylene glycol, tetraethylene glycol, dipropylene glycol, tripropylene glycol, dibutylene glycol, tributylene glycol and tetrabutylene glycol, as well as their mixtures, and mixed polyoxyalkylene glycols like polyoxyetheylene-polyoxybutylene glycols and polyoxypropylene-polyoxybutylene-glycols. However, higher valent polycarboxylic acids in secondary quantities, from about 0 to 15 weight percent, more preferably from about 0 to 5 weight percent like tricarboxylic acids and/or tetracarboxylic acids and especially tri and/or tetravalent alcohols like glycerine, trimethylolpropane and/or pentaerythritol, can optionally be used to adjust for higher functionality and to adjust certain mechanical properties in the polyurethane elastomers, in preparing the polyester polyols, and organic dicarboxylic acids and diols.

Examples of esterification catalysts are: tin-II compounds and/or tin-IV compounds such as tin-II chloride, tin dioctoate or dibutyltin dilaurate and preferentially titanium compounds and most preferably orthotitanates having the formula $Ti(OR)_4$ in which R is a cyclic, more preferably a branched and most preferably a linear alkyl radical having from 1 to 6 carbon atoms, more preferably from 1 to 4 carbon atoms. Typical orthotitanates are: tetramethyl-, tetraethyl-, tetra-n-butyl-, tetraisobutyl-, tetra-sec.-butyl, tetra-tert.-butyl, tetra-n-pentyl-tetra-n-pentenyl-and tetra-n-hexyl-titanate. Tetra-n-butyl-titanate is preferably used as an esterification catalyst.

The esterification catalysts are used in quantities from about 000.2 to 5 weight percent, more preferably from about 0.1 to 1 weight percent, based on the weight of the mixture composed of polycarboxylic acids and/or their derivatives and multivalent alcohols. The esterification catalysts may be incorporated into the polycondensation mixture at the beginning of the esterification, continuously or step-wise during the course of the esterification, or at the end of the esterification. Furthermore, as previously discussed, polyester polyols which are either prepared catalyst free or with other esterification catalysts, may be subsequently treated at temperatures in excess of 150° C. with the tin and/or preferably titanium compounds, according to the process of this invention.

In preparing the non-cellular or cellular polyurethane elastomers, the polyester polyols (c) containing therein the tin and/or titanium compounds as catalysts may be exclusively employed as the catalyst. However, following one of the preferred embodiments, combinations of polyester polyols (c) and tertiary amines may be used as catalysts. Preferred catalysts combinations which may be used comprise: from about 0.001 to 5 parts by weight, more preferably from about 0.1 to 2 parts by weight of a tertiary amine and from about 0.1 to 5 parts by weight, more preferably from about 1 to 3 parts by weight of a mixture of at least 1 polyester polyol (c) and a polyether polyol containing therein the said tin and/or titanium compounds as catalysts, per 100 parts by weight of the starting components (B).

Examples of tertiary amines are: alykl amines such as triethylamine, tributylamine, dimethylbenzylamine, N,N,N',N-tetralkyl-alkyl diamines having from about 1 to 2 carbon atoms in the alkyl radical and from about 2 to 6 carbon atoms in the alkylene radical, such as N,N,N',N-tetramethyl-butylene-diamine, penta-alkyl-dialkylenetriamines, such as N,N,N',N'',N''-pentamethyl-diethylene triamine, N,N,N',N'-tetramethyl-diamino-ethylether, bis-(dimethylaminopropyl)-urea, N-methyl-, N-ethyl-, N-cyclohexylmorpholine, N,N'-dimethyl-, N,N'-diethylpiperazine, N,N'-dimethyl-aminoethyl-piperazine, N-alkyl-piperidines, such as ethyl- or methyl-piperidine 1,2-dimethylimidazol, 1-aza-bicyclo-(3,3,0)-octane and more preferably 1,4-diaza-bicyclo-(2,2,2)-octane, alkanolamine compounds such as triethanol-amine, triisopropanolamine, N-methyl- and N-ethyl-diethanolamine and dimethylethanolamine and iris-(dialkylaminoalkyl)-s-hexahydrotriazines, such as e.g. tris-(N,N'-diemethylaminopropyl)-s-hexa-hydrotriazine.

The tertiary amines may be employed individually or as mixtures, just as the polyester and/or polyether polyols used according to this invention. Preferably, from about 0.001 to 5 weight percent, most preferably from about 0.05 to 2 weight percent of a tertiary amine or amine mixture may be used as a catalyst. Similarly from about 0.11 to 10 weight percent, and most preferably from 0.51 to 5 weight percent may be used as a catalyst combination, based on the weight of the starting components (b).

Low boiling point liquids may be used as blowing agents (e) in the preparation of cellular polyurethane elastomers, which evaporate under the influence of the exothermic addition polymerization reaction. Suitable liquids are those which are inert to the polyisocyanate and those which have boiling points under 100° C. Examples of such preferred liquids are: halogenated hydrocarbons like methylenechloride, trichlorofloromethane, dichlorodiflorometane, dichloromono-fluoromethane, dichlorotetraflouroethane and 1,1,2-trichloro-1,2,2-triflouroethane. Mixtures of the slow boiling point liquids with one another and/or other substituted or unsubstituted hydrocarbons may also be used.

Water is also suited as a blowing agent. The water reacts with the polyisocyanates to form carbon dioxide and polyurea groups, and in turn influences the compressive strength of the final products. Since the quantity of water contained in the polyester polyols and polyether polyols as a by-product is generally sufficient, no separate water addition step is required. However, if the polyurethane formulation requires that an additional amount of water be incorporated into it, then generally the water is added amounts from about 0.05 to 1 weight percent, more preferably from about 0.1 to 0.5 weight percent, based on the weight of the starting components (b).

The amount of low boiling point liquid to be used in preparing the cellular polyurethane elastomers depends on the desired density, as well as on the amount of water which is optionally used. In general, amounts from about 1 to 10 parts by weight, more preferably from about 2 to 6 parts by weight based on 100 parts by weight of the component (b) provide satisfactory results.

Auxiliaries and/or additives (f) may also be optionally incorporated in the reaction mixture. Typical examples are surfactants, fillers, colorants, pigments, flame retardants, release agents, anti-hydrolysis agents, fungistats, and bacteriostats.

Surfactants which may be used are those which aid in homogenizing the initial materials. Typical examples are emulsifiers such as the sodium salts of castor oil sulfates or of fatty acids as well as salts of fatty acids with amines, for example, oleic acid diethylamine or stearic acid diethanolamine, salts of sulfonic acids such as alkali or ammonium salts of dodecylbenzenedisul-fonic acid or dinaphthylmethanedisulfonic acid and ricinoleic acid. The surfactants are generally used in amounts from about 0.01 to 5 parts by weight, based on 100 parts by weight of component (b).

Among the fillers, in particular reinforcing fillers, organic and inorganic fillers, reinforcing substances, weight-increasing substances and substances to improve the wear resistance of paints and coatings may be used. Typical examples of inorganic fillers are silicate minerals, for example, lamellar silicates such as antigorite, serpentine, hornblends, amphibole, chrisotile, talcum, metal oxides such as kaolin, aluminum oxides, titanium oxides, and iron oxides, metal salts such as chalk, heavy spar; and inorganic pigments such as cadmium sulfide, zinc sulfide, as well as powdered asbestos. It is preferred to use kaolin (China Clay), aluminum silicate, and co-precipitates of barium sulfate and aluminum silicate, as well as natural and synthetic fibrous minerals like asbestos and wollastonite. Typical organic fillers which may be used are coal, melamine, pine resin, cyclopentadienyl resins, and graft polymers based on styrene acrylonitrile prepared by in situ polymerization of acrylonitrile styrene mixtures of polyether polyols are described in German Pat. Nos. 11 11 394, 12 22 669, (U.S. Pat. Nos. 3,304,273; 3,383,351; 3,523,351; 3,523,093); German Pat. Nos. 11 52 536 (GB No. 1,040,452); and 11 52 537 (GB No. 987,618), which optionally may be aminated. Other organic fillers which can be used include polyoxyalkylene polyols or filler polyoxyalkylene polyamines, where aqueous polymer dispersions are converted to polyoxyalkylene polyol dispersions.

The inorganic and organic fillers may be used individually or in the form of mixtures. Preferably, stable filler polyoxyalkylene polyol dispersions are used in which the fillers are reduced to a particle size less than 7 in situ in the presence of polyoxyalkylene polyols by means of high localized energy densities and are dispersed at the same time; or styrene-acrylonitrile graft polymers are used.

The inorganic and/or organic fillers are incorporated in the reaction mixture, preferably in amounts from about 0.5 to 50 percent by weight, more preferably from about 1 to 40 percent by weight, based on the weight of components (a), (b) and (d).

Further information on the additional auxiliaries and additives as cited above may be found in the technical literature, such as the monograph by J.H. Saunders and K.C. Frisch, *High Polymers*, vol. VI *Polyurethanes*, Parts 1 & 2, Verlag Interscience Publishers Chemistry, 1962 and 1964, or in the *Plastics Handbook*, Vol. VII *Polyurethane*, First & Second Editions, Carl Hanser Verlag, Munich, 1966 & 1983.

In preparing the polyurethane elastomers, the organic polyisocyanate (a), higher molecular weight compounds having at least 2 reactive hydrogen atom (b), optionally chain extending agents and/or cross linking agents (d) and the polyester polyol (c) containing therein the said tin and/or titanium compounds, are all reacted in such effective amounts so that the equivalent ratio of NCO groups in the polyisocyanates (a) to the total of the reactive hydrogen atoms in the components (b) (c) and optionally (d) is 1:0.85 to 1.25, more preferably 1:0.95 to 1.15, and most preferably 1:0.89 to 1.05.

The polyurethane elastomers are prepared using a prepolymer or a one-shot process by means of reaction injection molding technology or preferably using low-pressure technology, by introducing the reaction mixture into a closed or open mold, which optionally may be closed after filling in order to achieve the desired green strength in the molded article.

When using a mixing chamber having several feed nozzles, the system components may be fed in individually and mixed intensively in the mixing chamber. It has been found to be particularly desirable to use a two-component process and to dissolve the optional chain extenders and/or cross linking agent (d), in the higher molecular weight compound (b), having at least two reactive hydrogen atoms and to combine them with the catalysts, or catalyst combination (c), optional blowing agents, as well as optional auxiliaries and additives, component (f), in component (A) and to use the organic polyisocyanates (a) preferably the modified organic polyisocyanates and/or isocyanate group-containing prepolymers as component (B). One advantage of this in processing is that the two main components only need to be mixed together in the appropriate amounts.

The amount of reaction mixture fed into the mold is established such that the dense polyurethane elastomers having a density of from 0.9 to 1.4 g/cm$^3$ and preferably from 1.0 to 1.2 g/cm$^3$, whereby optionally cellular elastomers may be formed, by the gases trapped in the reaction mixture, in particular air, or through the use of moist [water-containing] components (b), and the cellular polyurethane elastomers, which are obtained by adding controlled amounts of water or water and inert physical blowing agents, having a density of from about 0.3 to 0.8 g/cm$^3$, preferably from about 0.45 to 0.70 g/cm$^3$. The starting components are fed into the mold at temperatures from about 15° to 70° C., preferably about from 20° to 60° C. The mold is preferably constructed of metallic materials and is heated. The temperature of the mold is generally from about 20° to 90° C., preferably from about 25° to 65° C. It may optionally be advantageous to use conventional mold release agents, such as those based on waxes or silicone, in order to improve demolding. The degrees of compression used in the preparation of molded articles from cellular polyurethane elastomers are between about 1.1 to 10, preferably between about 2 and 6.

The non-cellular polyurethane elastomers obtained by the process of the present invention are suitable for use in the automobile industry, for example as bumper covering materials and body parts such as fenders, spoilers, and wheelhouse flairs, as well as engineering housings and rollers. The cellular polyurethane elastomers may be used as armrests, headrests, safety cushioning materials in automotive interiors, as well as motor-cycle and bicycle paddles, seat cushions, cover layers in foam laminates, and, in particular at densities from about 0.30 to 0.70 9/cm$^3$, as shoe soles.

EXAMPLE 1

66.67 parts by weight of adipic acid and a mixture of 11.77 parts by weight of 1,4 butanediol, 25.57 parts by weight of 1,5 pentanediol, and 13.77 parts by weight of 1,6-hexanediol were mixed together at room temperature while stirring in an atmosphere of nitrogen; the esterification mixture was slowly heated to 210° C. and the mixture was polycondensed at this temperature until 15.9 parts by weight of water had separated off (about 50 hours time required). The butanediol-pentanediol-hexanediol-polyadipate had the following characteristic features:
Hydroxyl Number:=55.1 mg KOH/g
Acid Number:=0.2 mg KOH/g
Viscosity at 25° C.:=6497 =mPas
Viscosity at 75° C.:=644 =mPas 500 ppm of tetra-n-butyltitanate was incorporated into the butanediol-pentanediol-hexanediol-polyadipate obtained, at room temperature; and the mixture was heated for 1.5 hours to 210° C. and following this it was allowed to cool.

COMPARATIVE EXAMPLE A

The procedure of Example 1 was repeated, with the exception that following the addition of 500 ppm of tetra-n-butyl titanate to the resulting butanediol-pentanediol-hexanediol-polyadipate, it was only heated to 65° C.

EXAMPLE 2

The procedure of Example 1 was repeated and the esterification mixture was condensed at 210° C., up to an acid number of 13. 500 ppm of tetra-n-butyl titanate was then added and the mixture condensed until 15.9 parts by weight of water had separated off. The total condensation time was about 10 hours. The butanediol-pentanediol-hexanediol-polyadipate had the following characteristic features:
Hydroxyl Number:=56.2 mg KOH/g
Acid Number:=0.4 mg KOH/g
Viscosity at 25° C.:=6371=mPas
Viscosity at 75° C.:=621=mPas

EXAMPLE 3

500 ppm of tetra-n-butyl titanate was added at room temperature to the esterification mixture described in Example 1 at the beginning of the polycondensation stage. Subsequently, the mixture was polycondensed at 210° C. until 15.9 parts by weight of condensation water had separated. The condensation time was about 8 hours. The butanediol-pentanediol-hexanediol-polyadipate had the following characteristic features:
Hydroxyl Number:=57.6 mg KOH/g
Acid Number:=0.6 mg KOH/g
Viscosity at 25° C.:=6234 =mPas
Viscosity at 75° C.:=615 =mPas

EXAMPLES 4 THROUGH 7

Examples 4 through 7 were performed according to the procedure of Example 3, except that the catalysts and their respective amounts as cited in Table I were used. The results are given in the Table I.

COMPARATIVE EXAMPLE B 1000 ppm of tetra-n-butyl titanate were incorporated into a difunctional polyoxypropylene-polyoxyethylene-polyol mixture, having an average hydroxyl number of 26, at 140° C.

EXAMPLES 8 THROUGH 10 AND COMPARATIVE EXAMPLES C THROUGH D

Preparing the Cellular Polyurethane Elastomers

A-Component

A mixture of varying parts by weight of an ethylene glycol-1,4-butanediol-polyadipate having a hydroxyl number of 56, as given in Table II, were mixed with varying parts by weight of a polyester polyol containing therein tetra-n-butyl titanate, as given in Table II. Each of the examples also included:
1.0 parts by weight of triethylene diamine (33 weight percent) dissolved in ethylene glycol,
3.9 parts by weight of an antistatic agent
0.16 parts by weight of a silicone oil (DC 193 from the Dow Corning Co.)
1.5 parts by weight of a color paste
1.8 parts by weight of 1,1,2-trichloro-2,2,1-triflouroethane,
8.95 parts by weight of ethylene glycol and
0.28 parts by weight of water

B-Component

An NCO-group-containing prepolymer having an NCO content of 18.7 weight percent, prepared by the reaction of 65 parts by weight of 1,4-butanediol-ethylene glycol-polyadipate (OH number 56) with 100 parts by weight of 4,4'-diphenylmethanediisocyanate.

100 parts by weight of the A-component and 93 parts by weight of the B-Component, corresponding to an NCO index of 100, were mixed together with the help of a low pressure proportioning machine of the type F20 from Elastogran Maschinenbau at 40° C.

260 g of the reaction mixture obtained was poured out into a metal mold heated to 45° C. which had the dimensions of 200×200×10mm, and it was allowed to cure in the closed mold. The mold time was about 4 seconds.

The ethylene glycol-1,4-butanediol-polyadipate quantities used and the type and quantity of polyester polyol containing therein the tetra-n-butyl titanate, used, as well as the foam times and the corner bend times measured on the polyurethane elastomers obtained are all summarized in Table II.

The examples and comparative examples demonstrate that the corner bend time is clearly reduced by the addition of the polyester polyols containing therein the tetra-n-butyl titanate.

EXAMPLES 11 AND 12 AND COMPARATIVE EXAMPLES E AND F

Preparing Cellular Polyurethane Elastomers

A-Component A mixture of:

varying parts by weight of a difunctional polyoxypropylene-polyoxyethylene-polyol mixture having an average hydroxyl number of 26, as given in Table III, were mixed with
varying parts by weight of a polyester polyol containing
therein tetra-n-butyl titanate, as given in Table III.
Each of the examples also included:
8.74 parts by weight of 1,4-butanediol
1.63 parts by weight of triethylenediame (25 weight percent dissolved in 1,4 butanediol),
0.016 parts by weight of dibutyltin dilaurate,
0.09 parts by weight of a silicon oil (DC 193 from Dow Corning) and
5.49 parts by weight of trichlorofluoromethane.

B-Component: Analogous to Examples 8 through 10

100 parts by weight of the A-Component and 51.9 parts by weight of the B-Component were processed analogous to the specification of Examples 8-10 into test plaques.

The polyoxypropylene-polyoxyethylene-polyol quantities used and the type and quantity of the polyester polyols containing therein the tetra-n-butyltitanate used, as well as the foam times and the corner bend times measured on the test plaques made from the polyurethane elastomers are all summarized on Table III.

The examples and comparative examples demonstrate that the corner bend time may be clearly reduced by the addition of the polyester polyol containing therein the tetra-n-butyl titanate.

TABLE I

| | Example | | | |
|---|---|---|---|---|
| | 4 | 5 | 6 | 7 |
| Tetra-n-butyltitanate (ppm) | 1000 | 5000 | — | — |
| A Metal Organic Tin Compound (ppm) (Swedcat ® 3 from the Swedstab AB Company | — | — | 1000 | — |
| A Metal Organic Tin Compound (ppm) (Swedcat ® 5 from the Swedstab AB Company | — | — | — | 1000 |
| Polycondensation time (hours) | 7 | 6 | 7 | 8 |
| Hydroxyl number (mg KOH/g) | 55.3 | 53.6 | 54.1 | 55.4 |
| Acid number (mg KOH/g) | 0.2 | 0.7 | 0.1 | 0.2 |
| Viscosity at 25° C. (mPas) | 7061 | 7409 | 7504 | 7109 |
| Viscosity at 75° C. (mPas) | 644 | 715 | 706 | 681 |

TABLE II

| | Example | | | Comparative Example | |
|---|---|---|---|---|---|
| | 8 | 9 | 10 | C | D |
| Ethylene glycol-butanediol-polyadipate (parts by weight) | 80.3 | 77.8 | 72.8 | 82.8 | 82.03 |
| a polyester-polyol according to Example 4 (parts by weight) | 2.5 | 5.0 | — | — | — |
| a polyester-polyol according to Example 2 (parts by weight) | — | — | 10 | — | — |
| a polyester-polyol according to comparative example A (parts by weight) | — | — | — | — | 2.5 |
| Foam times | | | | | |
| Cream time (sec) | 8 | 8 | 8 | 9 | 8 |
| Gel time (sec) | 23 | 25 | 24 | 25 | 24 |
| Rise time (sec) | 41 | 42 | 43 | 48 | 46 |
| Density (g/cm³) | 0.27 | 0.27 | 0.27 | 0.27 | 0.27 |
| Corner bend times (min) | 5' | 4' | <4' | 6'30" | 6'30" |

TABLE III

| | Example | | Comparative Example | |
|---|---|---|---|---|
| | 11 | 12 | E | F |
| a polyoxypropylene-polyoxyethylene-polyol mixture (parts by weight) | 81.48 | 78.48 | 83.98 | 78.98 |
| a polyester polyol according to Example 4 (parts by weight) | 2.5 | 5.0 | — | — |
| a polyoxypropylene-polyoxyethylene-polyol mixture according to comparative Example B (parts by weight) | — | — | — | 5.0 |
| Foam times | | | | |
| Gel time (sec) | 13 | 13 | 13 | 13 |
| Cream time (sec) | 20 | 25 | 20 | 24 |
| Rise time (sec) | 37 | 40 | 40 | 38 |
| Density (g/cm³) | 0.23 | 0.23 | 0.23 | 0.28 |
| Corner bend times (min) | 3'30" | <3' | 4'30" | 4'45" |

We claim:

1. A process for the preparation of cellular or non-cellular polyurethane elastomer comprising reacting:
   (a) an organic polyisocyanate with;
   (b) a higher molecular weight compound having at least 2 reactive hydrogen atoms, in the presence of
   (c) a polyester polyol containing a titanium compound, a tin compound or mixtures thereof as catalysts whereby the polyol is prepared through the polycondensation of an organic polycarboxylic acid with a multivalent alcohol in the presence of a titanium compound, a tin compound, or mixtures thereof as catalysts at temperatures from about 150° C. to 250° C.

2. The process according to claim 1, wherein the polyol, has a functionality of from about 2 to 4, a hydroxyl number of from about 20 to 300 and an acid number of less than about 10.

3. The process according to claim 1, wherein the polyol, is polycondensed by the addition of from about 0.002 to 5 weight percent of at least one titanium compound, a tin compound, or mixtures thereof, based on the weight of the mixture composed of polycarboxylic acid and multivalent alcohol.

4. The process according to claim 1, wherein the polyol, is polycondensed by the addition of from about 0.002 to 5 weight percent, based on the weight of the mixture comprised of polycarboxylic acid and multivalent alcohol, of at least one ortho-titanic ester having the formula $Ti(OR)_4$ in which R stands for a linear, branched or cyclic alkyl radical having from about 1 to 6 carbon atoms.

5. The process according to claim 1, wherein the polyol, is used in a quantity of from about 0.1 to 10 parts by weight per 100 parts by weight of the higher molecular weight compounds having at least 2 reactive hydrogen atoms.

6. The process according to claim 1, wherein a combination is used as catalysts, comprised of a combination of tertiary amines and the polyester polyol of, said polyol prepared through the polycondensation of an organic polycarboxylic acid with a multivalent alcohol in the presence of a titanium compound, a tin compound, or mixtures thereof, as catalysts at temperature of from 150° to 250° C.

7. The process according to claim 1, wherein the organic polyisocyanate is selected from the group consisting of:
   (a) a prepolymer containing NCO groups, having an NCO content of from 25 to 9 weight percent, based on the weight of the entire mixture;
   (b) an organic polyisocyanate containing modified urethane groups, having an NCO content of from about 33.6 to 15 weight percent, based on the weight of the entire mixture; and
   (c) mixtures thereof.

8. The process according to claim 1, wherein the higher molecular weight compound having at least 2 reactive hydrogen atoms is selected from the group consisting of a polyether polyol, a polyester polyol having a functionality of from 2 to 4 and a molecular weight of from 1200 to 6000, and mixtures thereof.

* * * * *